United States Patent [19]

Cattani

[11] Patent Number: 4,534,546
[45] Date of Patent: Aug. 13, 1985

[54] DEVICE FOR LOCATING AND LOCKING A WORK HOLDING PALLET ON A MACHINE TOOL FIXTURE

[75] Inventor: Alberto Cattani, Modena, Italy

[73] Assignee: COMAU S.p.A., Grugliasco, Italy

[21] Appl. No.: 554,341

[22] Filed: Nov. 22, 1983

[30] Foreign Application Priority Data

Jul. 12, 1982 [IT] Italy ............................. 54037/82[U]

[51] Int. Cl.³ .............................................. B23Q 3/02
[52] U.S. Cl. ........................................ 269/58; 269/74; 269/309
[58] Field of Search ................. 269/309, 310, 81–85, 269/63, 58, 67–70, 74; 198/345

[56] References Cited

U.S. PATENT DOCUMENTS

| 2,558,289 | 6/1951 | Bihler | 269/84 |
| 3,100,636 | 8/1963 | Froehlich | 269/83 |
| 4,067,564 | 1/1978 | Kobane | 269/310 |
| 4,201,284 | 5/1980 | Brems | 198/345 |

*Primary Examiner*—Robert C. Watson
*Attorney, Agent, or Firm*—Young & Thompson

[57] ABSTRACT

In a device for locating and locking a work holding pallet on a machine tool fixture, the fixture comprises guides for supporting and guiding the sliding movement of the work holding pallet during their engagement, and a mobile central plug for engaging in a cavity in the work holding pallet. The fixture is provided with mobile means for pressing against the work holding pallet in order to move it with rotary motion about the plug, and abutment and stop structure is provided for the work holding pallet in order to arrest that rotation.

4 Claims, 4 Drawing Figures

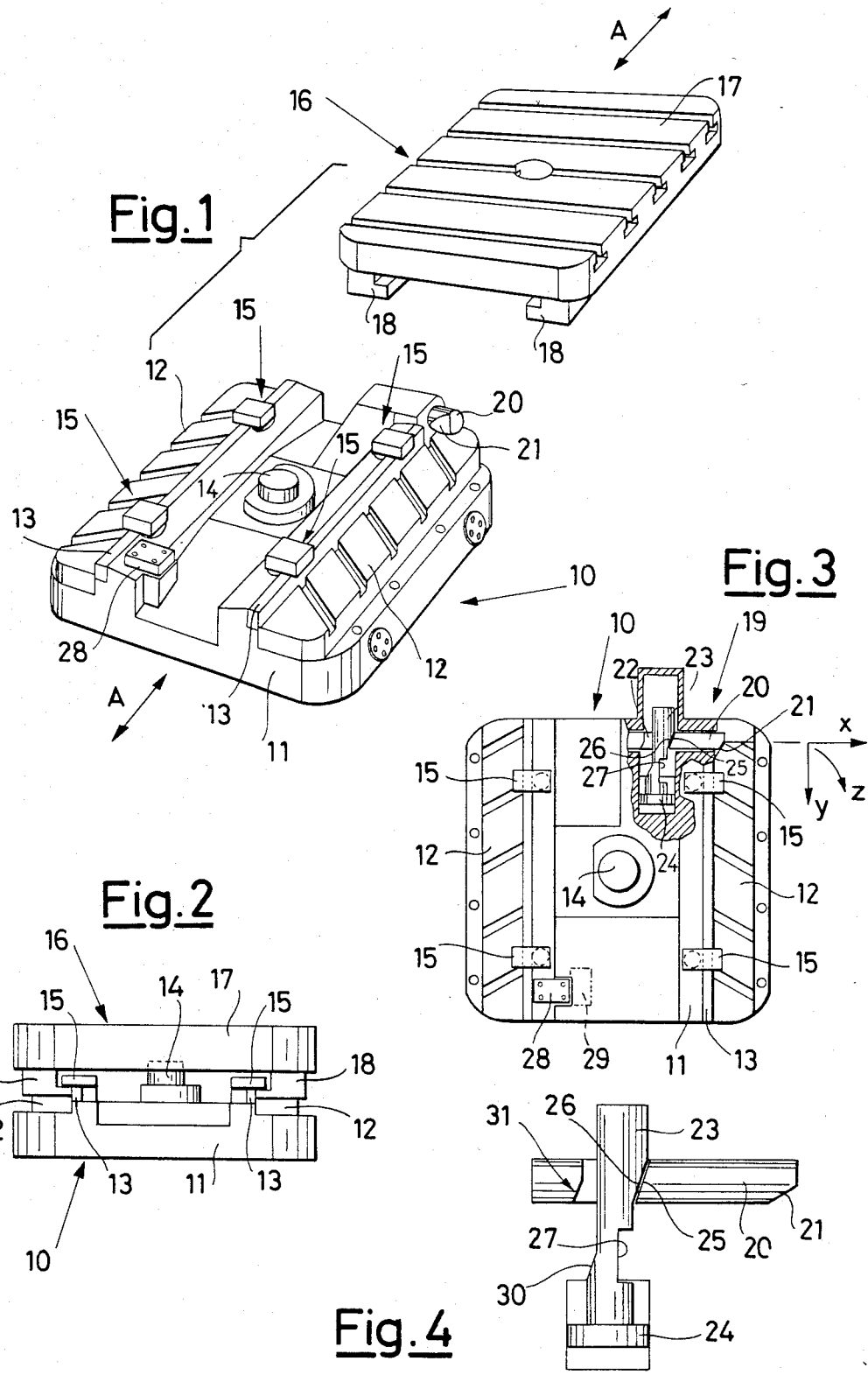

DEVICE FOR LOCATING AND LOCKING A WORK HOLDING PALLET ON A MACHINE TOOL FIXTURE

DESCRIPTION

The invention relates to a device for locating and locking a work holding pallet on a machine tool fixture.

The purpose of a fixture of this type is to lock a workpiece relative to the tool always in the same position and with considerable accuracy.

The workpiece is carried by a work holding pallet, and thus this latter must be coupled to the fixture.

To ensure locking and locating repeatability with precision, the device must be able to always take-up the slack which arises between the fixture and the work holding pallet, and this is not done simply, reliably or economically by analogous devices used at the present time.

The main object of the invention is to provide a device which ensures repeatability of the positioning of the work holding pallet on the fixture, by correct and constant take-up of slack.

A further object is to provide a device which is extremely simple both in terms of its construction and operation, and thus of low cost.

It is also required to be of universal type, so that it can be fitted to machining centres, lathes or any other machine tool in which a work holding pallet has to be located and locked on a fixture in a repeatable manner.

These and further objects, which will be more apparent hereinafter, are attained according to the invention by a device for locating and locking a work holding pallet on the fixture of a machine tool in which the fixture comprises guides for supporting and guiding the sliding movement of the work holding pallet during their engagement, and a mobile central plug for engaging in a cavity in the work holding pallet, characterised in that the fixture is provided with first mobile means for pressing against the work holding pallet in order to move it with rotary motion about said plug, and second abutment and stop means for the work holding pallet in order to arrest said rotation.

The invention is described hereinafter with reference to the accompanying drawing in which:

FIG. 1 shows a fixture and a work holding pallet, which are in separated relationship and lie along their engagement and withdrawal direction indicated by the arrows A;

FIG. 2 shows the condition in which the elements of FIG. 1 are mutually engaged;

FIG. 3 is a partly sectional plan view of the fixture;

FIG. 4 is an enlarged view of a detail of FIG. 3.

The fixture 10 consists of a base 11, which is usually rigid with the machine base and on which there are provided two longitudinal guides 12 for support purposes and two guides 13 for the purpose of guiding the sliding movement, between said guides there being centrally disposed a plug 14 which is axially slidable by means of suitable actuators in order to assume a retracted position in which it is in line with the base, and an extended position as shown in the figure.

To the side of the lateral guides 12 there are provided shoes 15 for locking the work holding pallet 16, which comprises a base 17 for supporting and fixing the piece to be machined, and lower guides 18 slidable on the guides 12 of the fixture 10, and retained between these latter and the shoes 15, as shown in FIG. 2, in order to prevent the fixture 10 and pallet 16 from separating after their engagement. Any longitudinal sliding of the fixture 10 is prevented by the plug 14 which when extended enters a suitable cavity in the pallet 16.

This is familiar to any expert of the art, and does therefore not require further explanation.

According to the invention, the device 19 shown in FIG. 3 is fitted to the fixture 10. This device consists of a pin 20 slidable in a suitable seat in the fixture 10, and provided with an end chamfer 21.

Said pin 20 comprises a through bore 22 in which the rod 23 of a cylinder 24 slides. The rod 23 has a flat inclined surface 26 which abuts against a corresponding surface 25 of the pin 20. As the pin 20 and rod 23 move along orthogonal axes, retraction of the rod 23 causes the pin 20 to move towards the outside of the fixture 10 as shown in FIGS. 3 and 4. When the rod 23 is extended, its slot 27 enters the bore 22, to allow the pin 20 to slide freely inside the fixture 10.

According to the invention, on the fixture 10 there is also mounted a fixed locator 28 diametrically opposite the described device 19.

The operation is as follows.

After the work holding pallet 16 has been mounted on the fixute 10 and centered by means of the plug 14, which enters the relevant cavity, there remains the problem of the slack which always arises when the positioning has to be repetitive, as in this case, and this slack must be eliminated because on such machine tools the machining is of high precision, with the result that the workpiece must be positioned with equal high precision, otherwise the finished piece will be rejected.

When the cylinder 24 is operated in order to extend the pin 20, this abuts against a stop on the pallet 16, this stop having an inclined surface corresponding to the chamfer 21 of said pin. This exerts a thrust on the pallet 16 in the direction of the orthogonal arrows x, y, and also a rotation along the arrow z by virtue of the fact that the pallet 16 is pivoted on the plug 14.

The rotation along the arrow z is of minimum extent, but sufficient to urge a stop 29 (FIG. 3) on the work holding pallet 16 against the fixed locator 28 of the fixture 10. This enables the slack of the plug 14 to be taken up, to ensure constant positioning repeatability for any type or extent of slack which is created between the two elements.

At this point, the shoes 15 irreversibly lock the work holding pallet 16 to the guides 12, thus making the fixture 10 rigid with the work holding pallet 16.

On retracting the rod 23, the pin 20 is no longer urged outwards, and instead is returned inwards by the action of the inclined surface 30 of the rod 23 on the surface 31 of the pin 20, and when the plug 14 has returned to its position in line with the base 10 and the shoes 15 are released, the pallet 16 can be withdrawn.

A device is therefore provided which combines positioning repeatability of the work holding pallet 16 with simplicity and thus economy of the device itself, which is also universal in application.

I claim:

1. A device for locating and locking a work holding pallet on a machine tool fixture, in which the fixture comprises guides for supporting and guiding the sliding movement of the work holding pallet during their engagement, and a mobile central plug for engaging in a cavity in the work holding pallet, characterized in that said sliding movement is rectilinear sliding movement and the fixture is provided with first mobile means for pressing against the work holding pallet in order to move it with rotary motion about said plug in a direction having a component transverse to the direction of said rectilinear sliding movement, and second abutment and stop means for the work holding pallet in order to arrest said rotation.

2. A device as claimed in claim 1, characterized in that the first means are constituted by a pin and cylinder, which pin, on the operation of the cylinder, is extended from the fixture and enters a seat in the work holding pallet.

3. A device as claimed in claim 2, characterized in that the cylinder has a rod, and the pin comprises a through bore having its opposing walls in the form of inclined surfaces, and with which there engages corresponding walls of the cylinder rod which moves in a direction orthogonal to the translatory movement of the pin in order to cause this latter to assume the extended or abutting position and the retracted or disengaged position when the rod is retracted or extended respectively.

4. A device as claimed in claim 1, characterised in that the second means are diametrically opposite the first means with respect to the plug.

* * * * *